Patented Apr. 11, 1939

2,153,560

UNITED STATES PATENT OFFICE 2,153,560

REAGENT AND PROCESS FOR TREATING PETROLEUM OILS

Paul R. Hershman, Chicago, Ill., assignor to Petro Chemical Company, Chicago, Ill., a corporation of Illinois No Drawing. Application June 7, 1934, Serial No. 729,480. Renewed November 18, 1936

15 Claims. (Cl. 196—4)

This invention relates to desalting crude oils, breaking petroleum oil-brine emulsions, and recovering valuable petroleum oil from "B. S.", cut oil and the like; more specifically, the invention deals with the desalting of crude petroleum oil of the type found in the Michigan producing region particularly those obtained from acid-treated wells where the crude oil contains a large amount of inorganic salts and complex brines.

In accordance with my invention I have discovered that if salt-containing crudes or emulsified oils of the nature of those above mentioned are treated with my novel reagent, the salt can be reduced to a negligible amount.

The composition can be prepared by thoroughly mixing at ordinary temperature formalin, trioxymethylene, or other aldehyde with naphthenic or sulfo-naphthenic acids, or saponified naphthenic or sulfo-naphthenic acids, and the mass stirred thoroughly until a viscous homogeneous product results. It is not believed that any condensation takes place but I do not limit myself to the specific nature of the composition. Glycerine may also be added to improve the texture of the product. The reagents are used in the following proportions—

| | Percent |
|---|---|
| Aldehyde | 10–20 |
| Polyalcohol (glycerine) | 10–20 |
| Naphthenic or sulfo-naphthenic acid or soluble salts thereof | 60–80 |

A suitable composition may also be prepared by mixing an aldehyde such as formaldehyde and a polyalcohol such as glycerine with naphthenic or sulfo-naphthenic acids and heating the mixture to a temperature of approximately 150° F. for a period of about one hour. In place of the alcohol a carbohydrate such as starch may be used. In place of the naphthenic or sulfo-naphthenic acids, salts of these acids such as sodium salt may be used, but in the latter case a small amount of sulfuric acid (approximately ½ of 1%) should be added to act as a condensing agent. It is believed that some condensation takes place between the reagents giving rise to a product which is particularly effective for the purposes of my invention. As a specific example of the proportions of ingredients used in making the reagent, 50 to 80% of naphthenic or sulfo-naphthenic acids, or the sodium salts thereof, are mixed with 10 to 20% of formaldehyde and 10 to 20% of glycerine or starch solution. When this mixture is treated as above described a product is formed which is effective in desalting crudes and breaking water in oil emulsions of all kinds. The reagent may be added to the oil as is or dissolved or mixed with water.

In using the composition it is added to the oil at atmospheric or elevated temperature in proportions of .1 to 1% based on the weight of the oil treated, and mixed thoroughly. It has been found that this reagent is even effective at very low temperatures down to freezing. However, its action is expedited by heating in cold weather.

As an example, 10,000 bbls. of crude oil having a salt content of .75% was treated with .2% of the composition which was prepared as above described at ordinary temperature. The reagent was thoroughly mixed with the oil and the mixture heated to 135° F. in a closed system under pressure. The oil and brine separated quickly and 95% of the oil was recovered free of water and having a salt content of only .02%. The brine, containing the reagents, which separated from the oil was reused to desalt and demulsify two similar batches of oil and the salt content in each case was brought down to .02%.

I claim:

1. A method of desalting and demulsifying oils which comprises treating the oils with a composition prepared by mixing a reagent containing a naphthenic acid radical together with an aldehyde.

2. A method of desalting and demulsifying oils which comprises treating the oils with a composition prepared by mixing naphthenic acids with an aldehyde.

3. A method of desalting and demulsifying oils which comprises treating the oils with a composition prepared by mixing sulfo-naphthenic acids and aldehydes.

4. A method of desalting and demulsifying oils which comprises treating the oils with a composition prepared by mixing saponified naphthenic acids with an aldehyde.

5. Method according to claim 1 in which the composition is prepared at ordinary temperatures.

6. Method according to claim 2 in which the composition is prepared at ordinary temperatures.

7. Method according to claim 3 in which the composition is prepared at ordinary temperatures.

8. Method according to claim 4 in which the composition is prepared at ordinary temperatures.

9. A method of desalting and demulsifying oils which comprises treating the oils with a composition prepared by mixing a reagent of the class consisting of naphthenic and saponified naphthenic acids, sulfo-naphthenic and saponified sulfo-naphthenic acids together with an aldehyde and a poly-alcohol.

10. Method according to claim 9 in which the composition is prepared at ordinary temperatures.

11. A new emulsion breaker reagent comprising a naphthenic derivative in the proportion of approximately 50 to 80%, an aldehyde in approximate proportion of 10 to 20%, and a texture-improving ingredient having the characteristic of glycerin in the proportion approximately of 10 to 20%.

12. The method of breaking petroleum oil brine emulsions which comprises treating the same with a mixture of sodium naphthenate, formaldehyde, and glycerin at a temperature of approximately 135° F. in a closed system under pressure, and then recovering the separated oil from the brine.

13. The method as set forth in claim 12 in which the separate brine is reused to treat a new batch of emulsion.

14. In a method of breaking petroleum emulsions, the step which consists in mixing with the emulsion a reagent comprising a formaldehyde liberating substance and a naphthenic acid soap dissolved in a solvent miscible with the emulsion.

15. A method of demulsifying oils which comprises treating the oils with a composition prepared by mixing a reagent containing a naphthenic acid radical together with an aldehyde.

PAUL R. HERSHMAN.